(12) United States Patent (10) Patent No.: US 12,647,829 B2
Yan (45) Date of Patent: Jun. 2, 2026

(54) DATA PROCESSING METHOD AND APPARATUS, TERMINAL DEVICE, AND COMPUTER STORAGE MEDIUM

(71) Applicant: TENCENT CLOUD COMPUTING (Beijing) CO., LTD., Beijing (CN)

(72) Inventor: Yuan Yan, Beijing (CN)

(73) Assignee: TENCENT CLOUD COMPUTING (Beijing) CO., LTD, Beijing (CN)

( * ) Notice: Subject to any disclaimer, the term of this patent is extended or adjusted under 35 U.S.C. 154(b) by 592 days.

(21) Appl. No.: 18/118,578

(22) Filed: Mar. 7, 2023

(65) Prior Publication Data

US 2023/0232281 A1 Jul. 20, 2023

Related U.S. Application Data

(63) Continuation of application No. PCT/CN2021/107656, filed on Jul. 21, 2021.

(30) Foreign Application Priority Data

May 20, 2021 (CN) .......................... 202110555059.7

(51) Int. Cl.
*H04W 28/08* (2023.01)
*H04W 28/02* (2009.01)

(52) U.S. Cl.
CPC ... *H04W 28/0975* (2020.05); *H04W 28/0236* (2013.01)

(58) Field of Classification Search
CPC ......... H04W 28/0975; H04W 28/0236; H04W 28/02; H04W 28/08; H04W 28/24;
(Continued)

(56) References Cited

U.S. PATENT DOCUMENTS 12,273,763 B2 * 4/2025 Mach .................... H04W 24/10
12,323,501 B2 * 6/2025 Shribman ............. H04L 63/029
(Continued)

FOREIGN PATENT DOCUMENTS

CA 2899192 A1 * 7/2014 ............ H04W 36/02
CA 3093614 A1 * 3/2021 ............. H04L 65/65
(Continued)

OTHER PUBLICATIONS

PE2E Search machine translated document of CN_107608832 (Year: 2018).*

(Continued)

*Primary Examiner* — Mohammad S Adhami
*Assistant Examiner* — Vladislav Y Agureyev
(74) *Attorney, Agent, or Firm* — Morgan, Lewis & Bockius LLP

(57) ABSTRACT

Disclosed in embodiments of this application are a data processing method and apparatus, a terminal device, and a non-transitory computer-readable storage medium. When the terminal device determines that a delay is less than a standard index, estimation of a load situation of a base station is triggered. Based on an obtained load value, a QoS service request can be initiated by the terminal device in a accordance with a determination that the base station is heavily-loaded, thereby effectively avoiding ineffective calling of a QoS service by the terminal device and improving effectiveness of service calling.

19 Claims, 6 Drawing Sheets

(58) Field of Classification Search

CPC .......................... H04W 28/0289; H04W 4/24; H04L 41/5009; H04L 43/0876; H04L 43/16; H04L 43/0852; H04L 5/14

See application file for complete search history.

(56) References Cited

U.S. PATENT DOCUMENTS

| | | | | |
|---|---|---|---|---|
| 2002/0129157 A1* | 9/2002 | Varsano | .............. | H04L 41/5006 709/224 |
| 2003/0072302 A1* | 4/2003 | Yakura | .............. | H04M 15/8044 370/356 |
| 2008/0037510 A1* | 2/2008 | Yamada | .............. | H04W 56/002 370/349 |
| 2012/0224481 A1* | 9/2012 | Babiarz | .............. | H04L 47/2408 370/230.1 |
| 2013/0101002 A1* | 4/2013 | Gettings | ......... | H04N 21/41265 375/E7.138 |
| 2014/0105060 A1* | 4/2014 | Baillargeon | ............ | H04W 8/24 370/253 |
| 2015/0067819 A1* | 3/2015 | Shribman | .............. | H04L 67/06 709/218 |
| 2018/0150334 A1* | 5/2018 | Bernat | .................... | H03M 7/40 |
| 2018/0260162 A1* | 9/2018 | Xiao | .................. | G06F 11/3034 |
| 2019/0007855 A1 | 1/2019 | Lee et al. | | |
| 2019/0274082 A1* | 9/2019 | Vemuri | .............. | H04M 7/0057 |
| 2020/0059856 A1* | 2/2020 | Cui | ......................... | H04L 41/40 |
| 2021/0051086 A1 | 2/2021 | Yang et al. | | |
| 2021/0258639 A1* | 8/2021 | Dureau | .............. | H04N 21/482 |
| 2021/0378027 A1* | 12/2021 | Wang | .............. | H04W 36/0077 |

FOREIGN PATENT DOCUMENTS

| | | | | | |
|---|---|---|---|---|---|
| CN | 102742320 A | * | 10/2012 | .............. | H04W 8/04 |
| CN | 104066125 A | | 9/2014 | | |
| CN | 104519556 A | | 4/2015 | | |
| CN | 107534916 A | | 1/2018 | | |
| CN | 107608832 A | * | 1/2018 | | |
| CN | 108391465 A | | 8/2018 | | |
| CN | 109428889 A | * | 3/2019 | ......... | G06F 11/3442 |
| CN | 110557290 A | | 12/2019 | | |
| EP | 2393321 A1 | * | 12/2011 | ......... | H04W 36/144 |
| EP | 3454530 A1 | * | 3/2019 | ............. | G06F 30/34 |
| EP | 3562093 A1 | * | 10/2019 | .......... | H04L 41/083 |
| JP | 2020016184 A | * | 1/2020 | | |
| WO | WO 2014015676 A1 | | 1/2014 | | |
| WO | WO 2015062039 A1 | | 5/2015 | | |
| WO | WO 2017071669 A1 | | 5/2017 | | |
| WO | WO-2020220739 A1 | * | 11/2020 | ............. | H04L 67/63 |
| WO | WO-2021028040 A1 | * | 2/2021 | ......... | H04L 43/0858 |

OTHER PUBLICATIONS

PE2E Search machine translated document of WO_2015062039 (Year: 2015).*

ZTE Corporation, Sanechips, "Consideration on the Support of Local Cache in EN-DC", 3GPP TSG RAN WG2#103, Gothenburg, Sweden, Aug. 20-24, 2018, Document: R2-1811735, 2 pgs., Retrieved from the Internet: https://www.3gpp.org/ftp/tsg_ran/WG2_RL2/ TSGR2_103/Docs.

Tencent Technology, Extended European Search Report, EP Patent Application No. 21940390.4, Aug. 6, 2024, 11 pgs.

Tencent Technology, WO, PCT/CN2021/107656, Feb. 15, 2022, 3 pgs.

Tencent Technology, IPRP, PCT/CN2021/107656, Nov. 21, 2023, 4 pgs.

Tencent Technology, ISR, PCT/CN2021/107656, Feb. 15, 2022, 2 pgs.

* cited by examiner

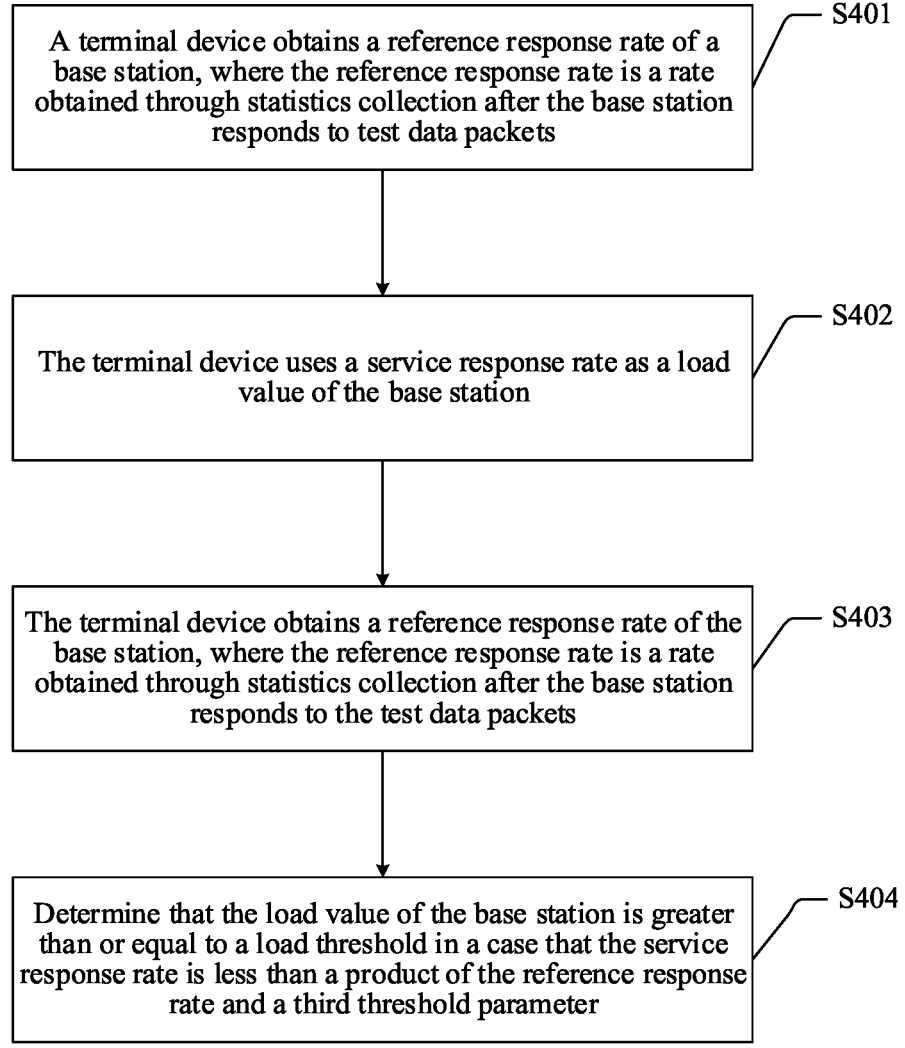

A terminal device obtains a reference response rate of a base station, where the reference response rate is a rate obtained through statistics collection after the base station responds to test data packets — S401

The terminal device uses a service response rate as a load value of the base station — S402

The terminal device obtains a reference response rate of the base station, where the reference response rate is a rate obtained through statistics collection after the base station responds to the test data packets — S403

Determine that the load value of the base station is greater than or equal to a load threshold in a case that the service response rate is less than a product of the reference response rate and a third threshold parameter — S404

FIG. 7

DATA PROCESSING METHOD AND APPARATUS, TERMINAL DEVICE, AND COMPUTER STORAGE MEDIUM

CROSS-REFERENCE TO RELATED APPLICATION

This application is a continuation application of PCT Patent Application No. PCT/CN2021/107656, entitled "DATA PROCESSING METHOD AND APPARATUS, TERMINAL DEVICE, AND COMPUTER STORAGE MEDIUM" filed on Jul. 21, 2021, which claims priority to Chinese Patent Application No. 202110555059.7 entitled "DATA PROCESSING METHOD AND APPARATUS, TERMINAL DEVICE, AND COMPUTER STORAGE MEDIUM" and filed with the National Intellectual Property Administration, PRC on May 20, 2021, all of which are incorporated herein by reference in their entirety.

FIELD OF THE TECHNOLOGY

Embodiments of this application relate to the field of computer technologies, and in particular, to a data processing method and apparatus, a terminal device, and a computer storage medium.

BACKGROUND OF THE DISCLOSURE

In a mobile communication system, a data packet may cause a network congestion when transmitted from a mobile terminal to a cloud server, and a quality of service (QoS) capability can be called to effectively alleviate the network congestion. However, the QoS capability can only effectively resolve a network congestion caused by excessive load on a base station. For network congestions caused by other reasons, calling the QoS acceleration capability results in a waste of resources. Therefore, how to improve the effectiveness in calling the QoS acceleration capability is a current research hotspot.

SUMMARY

The embodiments of this application provide a data processing method and apparatus, a terminal device, and a computer storage medium, and can improve the effectiveness in calling a QoS acceleration capability.

According to an aspect, an embodiment of this application provides a data processing method performed by a terminal device, including:

determining a target data link between the terminal device and a base station when a delay in running a target service is less than a standard index, the target data link being associated with a duplex mode currently used by the terminal device;

determining a load value of the base station based on a transmission parameter of the target data link, the transmission parameter representing a transmission situation of transmitting a test data packet on the target data link; and transmitting an acceleration request to a target server when the load value of the base station is greater than or equal to a load threshold, the acceleration request instructing the target server to perform service acceleration on the target service.

According to another aspect, an embodiment of this application provides a terminal device as a data processing apparatus. The apparatus includes:

an obtaining unit, configured to determine a target data link between the terminal device and a base station when a delay in running a target service is less than a standard index, the target data link being associated with a duplex mode currently used by the terminal device, the obtaining unit being further configured to determine a load value of the base station based on a transmission parameter of the target data link, the transmission parameter representing a transmission situation of transmitting a test data packet on the target data link; and a transmitting unit, configured to transmit an acceleration request to a target server when the load value of the base station is greater than or equal to a load threshold, the acceleration request instructing the target server to perform service acceleration on the target service.

According to still another aspect, an embodiment of this application provides a terminal device. The terminal device includes an output interface and further includes:

a processor, suitable to implement one or more instructions; and a computer storage medium, storing one or more instructions, the one or more instructions being suitable to be loaded by the processor to perform the following operations:

determining a target data link between the terminal device and a base station when a delay in running a target service is less than a standard index, the target data link being associated with a duplex mode currently used by the terminal device;

determining a load value of the base station based on a transmission parameter of the target data link, the transmission parameter representing a transmission situation of transmitting a test data packet on the target data link; and transmitting an acceleration request to a target server when the load value of the base station is greater than or equal to a load threshold, the acceleration request instructing the target server to perform service acceleration on the target service.

According to still another aspect, an embodiment of this application provides a non-transitory computer-readable storage medium, storing one or more instructions, the one or more instructions being suitable to be loaded by a processor to perform the following operations:

determining a target data link between the terminal device and a base station when a delay in running a target service is less than a standard index, the target data link being associated with a duplex mode currently used by the terminal device;

determining a load value of the base station based on a transmission parameter of the target data link, the transmission parameter representing a transmission situation of transmitting a test data packet on the target data link; and transmitting an acceleration request to a target server when the load value of the base station is greater than or equal to a load threshold, the acceleration request instructing the target server to perform service acceleration on the target service.

According to still another aspect, an embodiment of this application provides a computer program product, the computer program product includes a computer program stored in a computer storage medium, and a processor reads the computer program from the computer storage medium and executes the computer program to cause a terminal device to perform the following operations:

determining a target data link between the terminal device and a base station when a delay in running a target service is less than a standard index, the target data link being associated with a duplex mode currently used by the terminal device;

determining a load value of the base station based on a transmission parameter of the target data link, the transmission parameter representing a transmission situation of transmitting a test data packet on the target data link; and transmitting an acceleration request to a target server when the load value of the base station is greater than or equal to a load threshold, the acceleration request instructing the target server to perform service acceleration on the target service.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

FIG. 7 is a schematic flowchart of determining a load situation of a base station according to an embodiment of this application.

DESCRIPTION OF EMBODIMENTS

Figure 1:
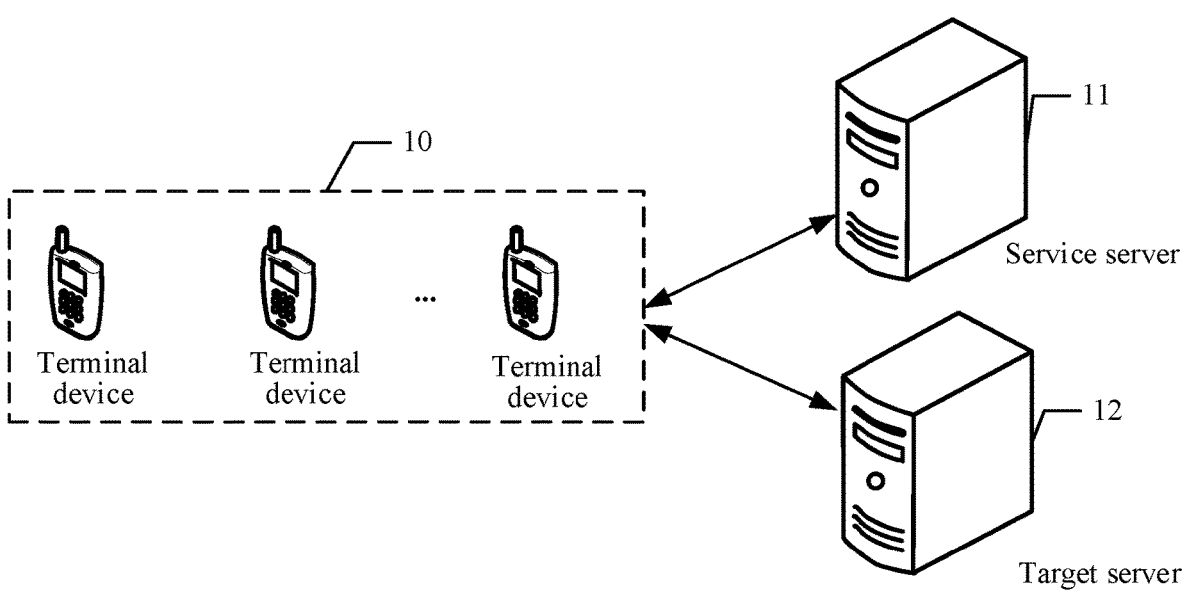
FIG. 1 is a schematic diagram of a data processing system according to an embodiment of this application.

In a mobile communication system, it is required to guarantee the performance of various services, for example, guarantee data transmission performance of a service by reducing a delay of the service. In an actual application, calling a quality of service (QoS) acceleration capability can reduce a delay of a service, where the QoS acceleration capability may be provided by a telecommunication operator (for example, China Mobile or China Telecom). For example, a telecommunication operator establishes a dedicated delay-guaranteed QoS bearer with a QoS class identifier (QCI) being equal to 3 for a service of a service provider, to accelerate the service. However, once the telecommunication operator successfully establishes the dedicated bearer, the telecommunication operator charges the service provider once, and the service provider needs to pay a fee to the telecommunication operator according to charging details. In some embodiments, for corresponding parameters when the QCI is equal to 3, and other QCIs as well as corresponding parameters thereof, refer to a standardized QCI characteristics table, which is shown in Table 1.

TABLE 1

| QCI | Resource Type | Priority | Packet Delay Budget (NOTE 1) | Packet Error Loss Rate (NOTE 2) | Example Services |
|---|---|---|---|---|---|
| 1 (NOTE 3) | GBR | 2 | 100 ms | $10^{-2}$ | Conversational Voice |
| 2 (NOTE 3) | | 4 | 150 ms | $10^{-3}$ | Conversational Video (Live Streaming) |
| 3 (NOTE 3) | | 3 | 50 ms | $10^{-3}$ | Real Time Gaming |
| 4 (NOTE 3) | | 5 | 300 ms | $10^{-6}$ | Non-Conversational Video (Buffered Streaming) |
| 5 (NOTE 3) | Non-GBR | 1 | 100 ms | $10^{-6}$ | IMS (IP Multimedia Subsystem) Signalling |
| 6 (NOTE 4) | | 6 | 300 ms | $10^{-6}$ | Video (Buffered Streaming) TCP-based (e.g., www, e-mail, chat, ftp, p2p file sharing, progressive video, etc.) |
| 7 (NOTE 3) | | 7 | 100 ms | $10^{-3}$ | Voice, Video (Live Streaming) Interactive Gaming |
| 8 (NOTE 5) | | 8 | 300 ms | $10^{-6}$ | Video (Buffered Streaming) |
| 9 (NOTE 6) | | 9 | | | TCP-based (e.g., www, e-mail, chat, ftp, p2p file sharing, progressive video, etc.) |

It can be seen from Table 1 that, the QCI may be simultaneously applied to bears for guaranteed bit rate (GBR) tasks, namely, real time tasks, and Non-GBR tasks. A value of the QCI may be used for specifying a control bearer-level packet forwarding mode defined in an access node (for example, a scheduling weight, an admission threshold, a queue management threshold, a link layer protocol configuration). The QCI, as one of the most important QoS indicators of an evolved packet system (EPS) bearer, represents a quantity level, and can represent a QoS characteristic that an EPS is required to provide for a service data flow (SDF), where each SDF is associated with a QCI. The SDF refers to an Internet protocol (IP) data flow or an aggregate of user IP data flows classified according to service types.

As shown in Table 1, Table 1 mainly includes 5 pieces of information: Resource Type, Priority, Packet Delay Budget (used for indicating a delay in transmitting data with the QCI), Packet Error Loss Rate, and Example Services. The Resource Type includes GBR and Non-BGR. The GBR means that a bit rate required by a bearer is a constant value allocated by a network permanently. The corresponding bit rate can be maintained even in a case of insufficient network resources. Generally, a GBR bearer is established only when required. The Non-GBR means that in a case of a network congestion, a service (or bearer) needs to accept a reduced rate. Because a Non-GBR bearer does not need to occupy a fixed network resource, the Non-GBR bearer can be established and maintained for a long time.

For example, in voice over LTE (VoLTE), generally, QCI=1, QCI=2, or QCI=5. QCI=1 applies to a voice bearer; QCI=2 applies to a video bearer; and QCI=5 applies to an IMS signalling bearer. In a common data service, QCI=9 is mainly used. That is, QCI=9 applies to ordinary Internet access service bearers, such as e-mail, chat, and p2p file sharing.

In addition, the QoS acceleration capability may be called not only when a load value of a base station is greater than or equal to a load threshold (or referred to as a heavily-loaded based station), but also when a load value of a base station is less than the load threshold (or referred to as a lightly-loaded base station). However, in the case of a lightly-loaded base station, calling the QoS acceleration capability has a limited effect on improving the data transmission capability. In other words, calling the QoS acceleration capability in the case of a lightly-loaded base station is ineffective calling. Therefore, to reduce costs of calling, it is necessary to ensure as far as possible that the QoS acceleration capability is called only in the case of a heavily-loaded base station. Therefore, the load of the base station needs to be estimated accurately.

An embodiment of this application provides a data processing method. The data processing method may be performed by a terminal device. In the data processing method, a terminal device can use different duplex modes to perform data communication. Each duplex mode is associated with a corresponding data link, and by obtaining a target data link associated with a duplex mode used by the terminal device, the terminal device can determine a load value of a base station. Then, when the load value is greater than or equal to a load threshold, the terminal device transmits an acceleration request to a target server, so as to perform service acceleration on a target service, thereby effectively avoiding ineffective calling of an acceleration capability. The target data link is a link on which a corresponding load value exceeds the load threshold when the base station uses the data link to transmit service data of the target service in a corresponding duplex mode.

For example, when the terminal device and a service server perform data transmission in a time-division duplexing (TDD) mode, an uplink capacity is limited first. In this case, when data transmission of the service data is performed over the uplink, the load value of the base station possibly exceeds the load threshold. That is, when the data transmission of the service data is performed over the uplink, the load value of the base station may exceed the load threshold. Therefore, a target data link corresponding to the TDD mode is an uplink.

Figure 2:
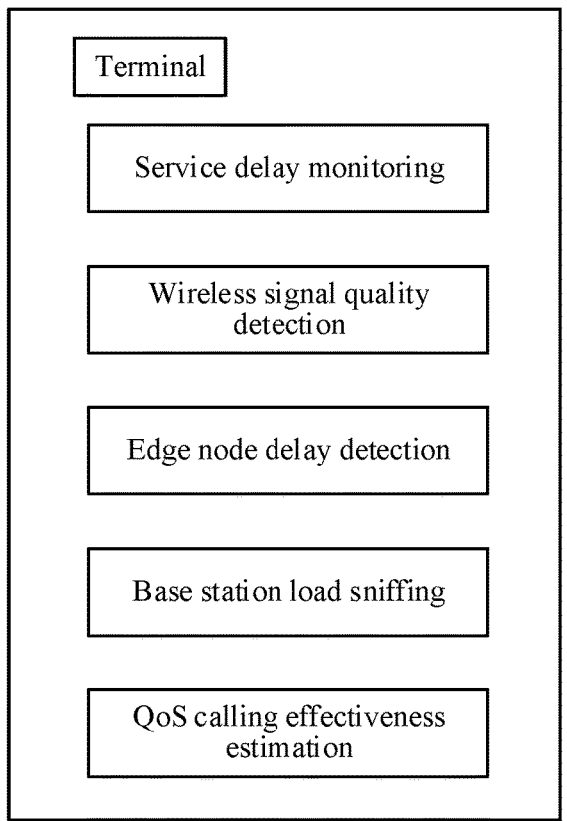
FIG. 2 is a schematic diagram of functions of a terminal device according to an embodiment of this application.
Figure 3:
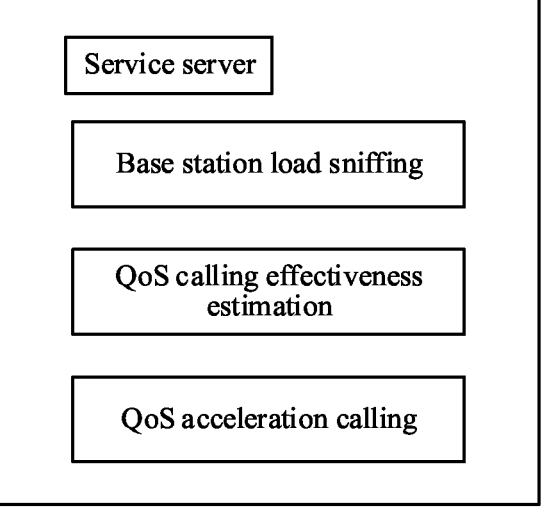
FIG. 3 is a schematic diagram of functions of a service server according to an embodiment of this application.

In some embodiments, the data processing method provided in this embodiment of this application is applied to a data processing system shown in FIG. 1. As shown in FIG. 1, the data processing system includes a plurality of terminal devices 10, a service server 11, and a target server 12. The service server 11 and the target server 12 each have a communication connection with each terminal device. In some embodiments, the terminal device is a terminal device that performs data communication by using any duplex mode. The terminal device may obtain a currently used duplex mode and obtain a corresponding target data link based on the duplex mode. Functions of the terminal device are shown in FIG. 2. In some embodiments, the service server 11 is configured to provide a target service run on the terminal device, and functions of the service server 11 are shown in FIG. 3. In some embodiments, the target server 12 is configured to perform service acceleration processing on the target service in response to an acceleration request. The service server 11 and the target server 12 may be different servers, or may be a same server, which is not limited in this embodiment of this application. Unless otherwise specified in the following descriptions, an example in which the service server 11 and the target server 12 are different servers is used for descriptions in the embodiments of this application.

In some embodiments, the terminal device can obtain a duplex mode used when the terminal device and the service server perform data communication with each other. For example, when the terminal device runs the target service, after detecting that a delay is less than a standard index, the terminal device obtains a currently used duplex mode. The delay of the target service is a service delay index. The service delay index may be used for determining whether a service delay (a bidirectional delay from the terminal device to the service server) corresponding to the target service meets a service requirement. The service delay index includes: a service processing delay, a data transmission delay, and the like. The corresponding service requirement includes: a requirement about a processing time of service data, a requirement about a transmission time of service data, and the like.

In some embodiments, when the delay is the service processing delay, the terminal device may determine the service processing delay by obtaining a transient delay in executing the target service within a target period. In some embodiments, when a target operation index is a service transmission delay, the terminal device may determine the service transmission delay by obtaining signal quality of the terminal device.

In some embodiments, after the terminal device obtains the target data link corresponding to the used duplex mode, the terminal device obtains transmission parameters of the target data link when the base station transmits the service data on the target data link, and determines, based on the transmission parameters, a load value corresponding to the base station when the base station transmits the service data on the target data link. The transmission parameters include the following two types: transmission delays of test data packets when the test data packets are transmitted on the target data link, or response rates of the base station to services corresponding to the test data packets (namely, service response rates) after the test data packets are transmitted on the target data link.

In some embodiments, after obtaining the target data link corresponding to the currently used duplex mode, the terminal device can request the service server to obtain the transmission parameters of the target data link when the base station transmits the service data on the target data link. After the service server obtains the transmission parameters, the service server can transmit the transmission parameters to the terminal device, so that the terminal device can determine, according to the transmission parameters, the load value corresponding to the base station when the base station transmits the service data on the target data link.

In some embodiments, after obtaining the target data link corresponding to the currently used duplex mode, the terminal device can request the service server to obtain the transmission parameters of the target data link when the base station transmits the service data on the target data link. The service server determines the load value corresponding to the base station based on the transmission parameters. After the service server obtains the load value, the terminal device can request the service server to transmit the load value to the terminal device, so that the terminal device determines the load value corresponding to the base station. This is not limited in this embodiment of this application.

In some embodiments, if the load value corresponding to the base station is greater than or equal to the load threshold, the terminal device can determine that the base station has heavy load and it is suitable to perform service acceleration processing. The terminal device can generate an acceleration request, and transmit the acceleration request to the target server, so that the target server performs service acceleration processing according to the acceleration request.

For example, the acceleration request is a QoS acceleration request, the target server calls a QoS acceleration capability according to the QoS acceleration request to perform service acceleration processing on the target service.

Figure 4:
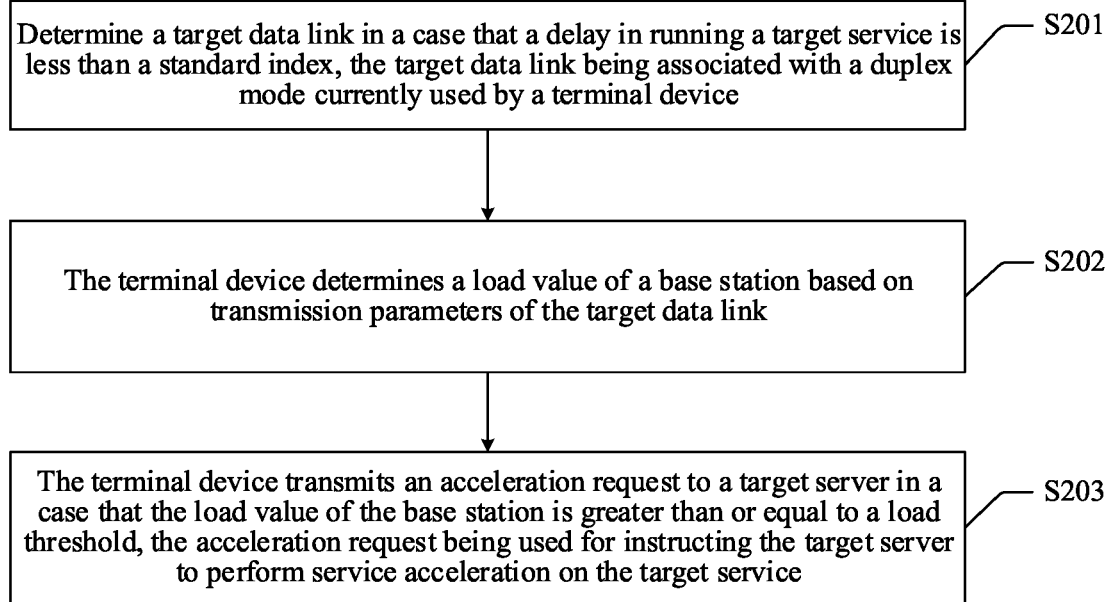
FIG. 4 is a schematic flowchart of a data processing method according to an embodiment of this application.

FIG. 4 is a schematic flowchart of a data processing method according to an embodiment of this application. The data processing method is performed by a terminal device. As shown in FIG. 4, the method includes the following steps:

S201. Determine a target data link between the terminal device and a base station when a delay in running a target service is less than a standard index, the target data link being associated with a duplex mode currently used by the terminal device.

In step S201, when the terminal device runs the target service, when the corresponding delay is less than the standard index, the duplex mode used when the terminal device and a service server perform data communication with each other is obtained.

The target service is provided by the service server. The delay of the target service is any one of the following: a service processing delay of the target service, or a data transmission delay of the target service. The duplex mode used by the terminal device includes a first duplex mode and a second duplex mode. The first duplex mode is a time-division duplexing (TDD) mode, and the second duplex mode is a frequency-division duplexing (FDD) mode. In some embodiments, the terminal device can determine whether a target operation index meets a service requirement by continuously monitoring a service delay periodically, that is, determine whether the delay is less than the standard index. If the delay is less than the standard index, the service requirement is not met. If the delay is greater than the standard index, the service requirement is met.

In some embodiments, the terminal device uses a corresponding delay in performing service processing as the service delay, and continuously monitors the service processing delay of the target service periodically. The terminal device obtains the service processing delay in the following manner: obtaining a transient delay in executing the target service at a reference moment within a target period; determining a first average delay and a second average delay based on the transient delay, where the first average delay is an average delay in executing the target service at the reference moment, and the second average delay is an average delay in executing the target service within the target period; and then determining the service processing delay of the target service based on the first average delay and the second average delay.

In some embodiments, the transient delay is an execution parameter, and the terminal device obtains the execution parameter when the target service is executed within the target period. The execution parameter includes: a transient delay in executing the target service at a reference moment t within the target period, where it is assumed that the transient delay is T(t); the terminal device then determines, based on the transient delay, a first average delay in executing the target service at the reference moment within the target period, where it is assumed that the first average delay is $T_{ave}(t)$. The terminal device determines the first average delay by using a method shown in equation 1:

$$T_{ave}(t) = \frac{t-1}{t} \cdot T_{ave}(t) + \frac{1}{t} \cdot T(t), \qquad \text{equation 1,}$$

where $T_{ave}(t)$ represents the first average delay, t represents the reference moment within the target period, and T(t) represents the transient delay.

Then, the terminal device can determine, based on the transient delay, a second average delay in executing the target service within the target period, and it is assumed that the second average delay is $$T_{ave}^{TW}(t).$$

The terminal device determines the second average delay by using a method shown in equation 2:

$$T_{ave}^{TW}(t) = \frac{1}{TW} \cdot \sum_{t-TW+1}^{t} T(t), \qquad \text{equation 2,}$$

where $$T_{ave}^{TW}(t)$$

represents the second average delay, t represents the reference moment within the target period, TW is a time window (the time window represents a period of time from a moment (t–TW) to the moment t), and T(t) represents the transient delay.

Then, the terminal device determines, based on the first average delay and the second average delay, the service processing delay of the target service, so as to determine, based on the service processing delay, whether an operation index of the service server meets the service requirement, that is, determine whether the delay is less than the standard index. In some embodiments, the terminal device can determine whether the current service processing delay meets the service requirement by comparing the service processing delay with a threshold parameter. The threshold parameter includes a first threshold parameter and a second threshold parameter.

In some embodiments, the terminal device uses the second average delay as the service processing delay, and if the second average delay is greater than the first threshold parameter (the first threshold parameter is set to $T_{th}$), it is determined that the operation index of the service server does not meet the service requirement, that is, the delay is less than the standard index.

For example, assuming that the second average delay is 100 ms (that is, $$T_{ave}^{TW}(t) = 100),$$

and the first threshold parameter is 90 ms (that is, $T_{th}$=90), because $$T_{th} < T_{ave}^{TW}(t),$$

the terminal device detects that the operation index is less than the standard index, that is, the delay is less than the standard index, and then obtains the duplex mode used when the terminal device and the service server perform data communication with each other.

In some embodiments, the terminal device uses a ratio (that is, a value of $$T_{ave}^{TW}(t)/T_{ave}(t)$$

between the second average delay and the first average delay as the service processing delay, and if the ratio is greater than the second threshold parameter (the second threshold parameter is set to $\lambda_{th}$), it is determined that the operation index of the service server meets the service requirement.

For example, assuming that the second average delay is 10 ms (that is, $$T_{ave}^{TW}(t) = 10),$$

the first average delay is 2 ms (that is, $T_{ave}(t)$=2), and the second threshold parameter is 1.3 (that is, $\lambda_{th}$=1.3), because $$T_{ave}^{TW}(t)/T_{ave}(t) = 5 > \lambda_{th},$$

the terminal device detects that the operation index is less than the standard index, that is, the delay is less than the standard index, and then starts to obtain the duplex mode used when the terminal device and the service server perform data communication with each other.

In some embodiments, in order to eliminate an impact of a carrier network delay on the service delay, in other words, eliminate an impact of the carrier network delay on estimation of load by the terminal device, the terminal device can further periodically monitor the data transmission delay of the target service continuously, and determine whether the current service processing delay meets the service requirement based on a manner in which the data transmission delay is compared with a delay threshold.

In some embodiments, the terminal device obtains signal quality of the terminal device, and obtains the data transmission delay of the service server in response to the signal quality being greater than a signal quality threshold. If the data transmission delay of the service server is greater than the delay threshold, it is determined that when the terminal device runs the target service, the corresponding delay is less than the standard index.

For example, in a 4G system, the terminal device obtains the signal quality based on a reference signal received power (RSRP) or a signal-to-interference-noise ratio (SINR). If the signal quality is less than the signal quality threshold, for example: RSRP<−105 dBm, the terminal device performs the following step again after an inhibition time: periodically monitoring the data transmission delay of the target service continuously. If the signal quality is greater than the signal quality threshold, for example: RSRP>−105 dBm, the terminal device obtains the data transmission delay of the service server.

In some embodiments, the service server is an edge cloud. The edge cloud refers to: a small-scale cloud data center that is distributed on an edge of a network and that is used for providing real-time data processing, and analysis and decision. The data transmission delay is an edge cloud delay, and the edge cloud delay refers to: a transmission delay in transmitting service data of the target service in a direction from the terminal device to the edge cloud. By measuring an edge cloud delay of an edge cloud closest to the terminal device, the terminal device can roughly estimate a carrier network delay based on the edge cloud delay. The terminal device implements measurement of the edge cloud delay by transmitting a delay measurement packet.

For example, the terminal device transmits the delay measurement packet based on a packet Internet groper (PING) command in an Internet control message protocol (ICMP). The PING command refers to a program command used for testing a quantity of network connections. Alternatively, the terminal device transmits the delay measurement packet on an application layer, that is, design is made on the application layer by simulating the PING command.

In some embodiments, the edge cloud delay obtained through measurement by the terminal device is greater than the delay threshold, indicating that the service delay is mainly caused by the carrier network delay. The terminal device determines that the operation index corresponding to the terminal device is less than the standard index when the terminal device runs the target service.

For example, a manner in which the terminal device selects the edge cloud closest to the terminal device is implemented with reference to a conventional content delivery network (CDN) scheduling system. Correspondingly, the terminal device transmits a request to global server load balance (GSLB) of a global scheduling system, and the GSLB selects an edge cloud closest to the terminal device based on a user Internet protocol (IP), user location information, or the like. The user IP may be an operator mobile gateway IP.

In step S201, the terminal device obtains the target data link associated with the duplex mode used by the terminal device.

The target data link is a link on which a corresponding load value exceeds a load threshold when a base station transmits data in a duplex mode, and the target data link is an uplink or a downlink. The duplex mode includes a first duplex mode and a second duplex mode. If the target data link associated with the first duplex mode is an uplink, the first duplex mode may be a TDD mode; and if the target data link associated with the second duplex mode is a downlink, the second duplex mode may be an FDD mode.

In some embodiments, when the terminal device and the service server in the TDD mode transmit data, a transmission rate of the uplink is limited, and the uplink is a data transmission link in a direction from the terminal device to the service server. When the terminal device and the service server in the FDD mode transmit data, a transmission rate of the downlink is limited, and the downlink is a data transmission link in a direction from the service server to the terminal device.

In some embodiments, if the target data link associated with the first duplex mode is a downlink, the first duplex mode is an FDD mode; and if the target data link associated with the second duplex mode is an uplink, the second duplex mode is a TDD mode. This is not limited in the embodiments of this application. Unless otherwise specified, an example in which the first duplex mode is a TDD mode and the second duplex mode is an FDD mode is used in the embodiments of this application for description.

S202. The terminal device determines a load value of the base station based on transmission parameters of the target data link.

The transmission parameters are obtained in the following manner: the terminal device transmits test data packets to the base station based on the target data link, and determines the transmission parameters corresponding to the target data link based on transmission results of the test data packets. The test data packets include a first test data packet and a second test data packet and there are a plurality of test data packets. The transmission result of the test data packet includes: a transmitting time of the test data packet, and a receiving time of a feedback data packet corresponding to the test data packet.

In some embodiments, the transmission parameter is a transmission delay corresponding to the target data link, the transmission delay is a time difference between the receiving time and the transmitting time, and the time difference is an absolute value of a difference between two time points (or two moments). In some embodiments, when the target data link is an uplink, the terminal device transmits a plurality of first test data packets to the base station based on the uplink, determines a time difference between a transmitting time of each of the first test data packets and a receiving time corresponding to each of the first test data packets as the transmission delay of each of the first test data packets, where the transmitting time is a time when each of the first test data packets is transmitted to the base station, and the receiving time is a time when the feedback data packet corresponding to each of the first test data packets is received, and determines a transmission delay of each of the first test data packets as a transmission parameter of the uplink.

For example, assuming that a time when the terminal device transmits a test data packet on the target data link is 09:01:20 (that is, the transmitting time is: 09:01:20), and a time when the terminal device receives the feedback data packet corresponding to the test data packet on the target data link is 09:01:21 (that is, the receiving time is: 09:01:21), the time difference between the transmitting time and the receiving time is 1 second, that is, the transmission delay is 1 second, and a transmission parameter corresponding to the target data link is 1 second.

In some embodiments, if the target data link is an uplink, the terminal device may obtain the transmission delays corresponding to the uplink based on the first test data packet. The first test data packet includes: a service delay measurement packet and a plurality of uplink service traffic packets. The feedback data packet corresponding to the first test data packet includes: a data response packet of the service delay measurement packet.

For example, when the first test data packet includes a service delay measurement packet and a plurality of uplink service traffic packets, the terminal device sends first test data packets in the following manner to obtain a plurality of transmission delays corresponding to the uplink: Before transmitting a service delay measurement packet, the terminal device injects a plurality of uplink service traffic packets of different sizes, and then the terminal device transmits the uplink service traffic packets, and transmits the service delay measurement packet after transmitting the uplink service traffic packets, to obtain a transmission delay through measurement. Then the terminal device transmits a plurality of first test data packets to obtain a plurality of transmission delays.

This manner of obtaining the transmission delays can avoid a random impact of a scheduling request (SR) on measurement of the transmission delays in a communication network (for example, 4G or 5G). In addition, based on a common scheduling algorithm (such as a proportional fair (PF) scheduling algorithm) of the base station, the terminal device can first transmit background service traffic of different sizes, so that when the base station is heavily loaded, transmission delays obtained through measurement have clearer differences (in a case of a heavily-loaded base station, there are different impacts on delay measurement results of subsequent delay measurement packets), and when the base station is lightly loaded, there are limited impacts on the delay measurement results of the delay measurement packets.

In some embodiments, the terminal device can continuously obtain two transmission delays by alternately transmitting an uplink service traffic packet with heavy traffic and an uplink service traffic packet with light traffic. The terminal device first transmits an uplink service traffic packet with heavy traffic, and then transmits a delay measurement packet (such as a PING packet), to obtain the first transmission delay through measurement; and when the second transmission delay needs to be obtained, the terminal device transmits an uplink service traffic packet with light traffic, and then transmits a delay measurement packet, to obtain the second transmission delay through measurement. The terminal device can obtain the corresponding transmission delay based on a time difference between the transmitting time of the uplink service traffic packet and the receiving time of the feedback data packet of the service delay measurement packet.

In some embodiments, the terminal device can obtain a plurality of transmission delays in the following manner: repeatedly performing steps that "the terminal device transmits an uplink service traffic packet with heavy traffic, and then transmits a delay measurement packet (such as a PING packet), to obtain the first transmission delay through measurement; and when the second transmission delay needs to be obtained, the terminal device transmits an uplink service traffic packet with light traffic, and then transmits a delay measurement packet, to obtain the second transmission delay through measurement", to obtain the plurality of transmission delays.

An alternating order in transmitting the uplink service traffic packet with heavy traffic and the uplink service traffic packet with light traffic is not limited in the embodiments of this application. That is, the terminal device can also first transmit the uplink service traffic packet with light traffic to obtain the first transmission delay, and then transmit the uplink service traffic packet with heavy traffic to obtain the second transmission delay, as long as it is ensured that the sizes of two uplink service traffic packets transmitted successively are different.

In some embodiments, the terminal device can also continuously obtain two transmission delays by using the following manner: After transmitting M (M is a positive integer greater than 1) uplink service traffic packets with heavy traffic, the terminal device transmits a delay measurement packet (such as a PING packet), to obtain the first transmission delay through measurement; and when the second transmission delay needs to be obtained, the terminal device may transmit L (L is a positive integer greater than 1) uplink service traffic packets with light traffic, and then transmit a delay measurement packet, to obtain the second transmission delay through measurement, where M and L may be the same.

In some embodiments, in response to the target data link being a downlink, the terminal device transmits a notification message to the service server. The notification message is used for instructing the service server to transmit second test data packets to the base station based on the downlink. The service server is configured to determine a transmission parameter corresponding to the downlink based on transmission results corresponding to the second test data packets. The transmission parameter is obtained from the service server. The second test data packet includes: a service delay measurement packet and a plurality of downlink service traffic packets. A manner in which the service server obtains the transmission parameters (that is, transmission delays) corresponding to the downlink and the foregoing manner in which the terminal device obtains the transmission delays corresponding to the uplink have the same principle, which is not described herein again in this embodiment of this application. In other words, when the target data link is a downlink, the terminal device can transmit a notification message to the service server, where the notification message is used for instructing the service server to transmit a plurality of second test data packets to the base station based on the downlink, and the service server is configured to determine a transmission parameter corresponding to the downlink based on a transmission delay or an actual response rate of each of the second test data packets; and the terminal device obtains the transmission parameter from the service server.

This manner of determining the transmission delays can avoid a random impact of connected mode discontinuous reception (C-DRX) from a terminal side on measurement of the transmission delays in a mobile network (for example, 4G or 5G). In addition, based on a common scheduling algorithm (such as a proportional fair (PF) scheduling algorithm) of the base station, the service server can first transmit background service traffic of different sizes, so that when the base station is heavily loaded, there are different impacts on transmission delays obtained subsequently through measurement by using delay measurement packets, and when the base station is lightly loaded, there are limited impacts on the transmission delays obtained subsequently through measurement by using the delay measurement packets.

In some embodiments, the terminal device can also transmit a notification message to the service server, so that the service server transmits second test data packets to the base station via the target data link, and transmits transmission results of the second test data packets to the terminal device. The terminal device determines transmission parameters corresponding to the downlink based on the transmission results. An execution body for determining the transmission parameters of the downlink is not specifically limited in this embodiment of this application.

In some embodiments, after obtaining a plurality of transmission delays, the terminal device can use a ratio between a delay mean value of the transmission delays and a delay standard deviation of the transmission delays as a load value of the base station. In other words, the terminal device can determine a delay mean value and a delay standard deviation of the transmission delays of the first test data packets, and determine a ratio between the delay mean value and the delay standard deviation as a load value of the base station.

For example, assuming that a total of N transmission delays are measured, the terminal device calculates an average value $T_N$ and a standard deviation $\sigma_N$ of the N transmission delays, and uses a ratio $\sigma_N/T_N$ between the average value and the standard deviation as the load value of the base station.

S203. The terminal device transmits an acceleration request to a target server when the load value of the base station is greater than or equal to a load threshold, the acceleration request instructing the target server to perform service acceleration on the target service.

In step S203, if the load value corresponding to the base station is greater than or equal to the load threshold, the acceleration request is generated. In response to the load value of the base station corresponding to the uplink being greater than or equal to the load threshold, the terminal device generates the acceleration request based on a load estimation result and other necessary information (such as a terminal mobile network IP), to call a service processing acceleration capability. In response to the load value of the base station corresponding to the downlink being greater than or equal to the load threshold, the service server obtains a load estimation result and transmits the load estimation result to the terminal device, and the terminal device generates the acceleration request based on the load estimation result and other necessary information (such as a terminal mobile network IP), to call the service processing acceleration capability.

In step S203, the terminal device transmits the acceleration request to the target server, so that the target server performs service acceleration processing on the target service based on the acceleration request.

In some embodiments, after generating the acceleration request, the terminal device transmits the acceleration request to the target server, and the target server performs service acceleration processing on the target service based on the acceleration request. Alternatively, after generating the acceleration request, the terminal device transmits the acceleration request to the service server, and the service server performs service acceleration processing on the target service based on the acceleration request.

Figure 5:
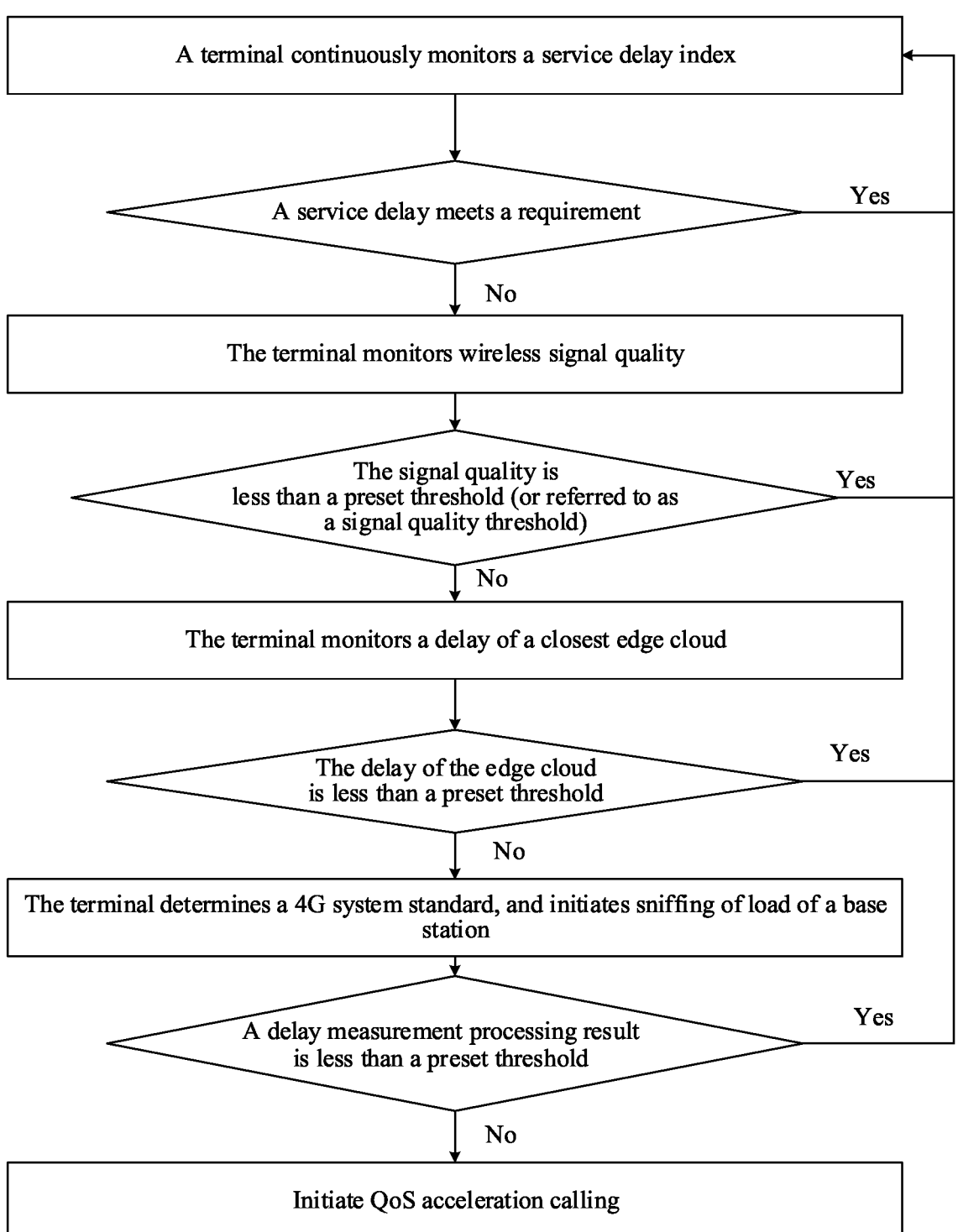
FIG. 5 is a schematic flowchart of performing a data processing method according to an embodiment of this application.

When the service processing acceleration capability is a QoS acceleration capability, an exemplary execution procedure of applying the data processing method provided in this embodiment of this application to a 4G system is shown in FIG. 5, and includes the following steps: The terminal device continuously monitors a service delay index to determine whether a current service delay meets the service requirement. If the current service delay meets the service requirement, the terminal device performs again, after a period of time (or referred to as an inhibition time), the step that the terminal device continuously monitors the service delay index. If the current service delay does not meet the service requirement, the terminal device monitors wireless signal quality. If the wireless signal quality is less than a signal quality threshold, it is determined that the service delay is caused by poor wireless signal quality, and in this case, calling the QoS acceleration capability is ineffective. After one inhibition time, the terminal device performs again the step that the terminal device continuously monitors the service delay index. Correspondingly, if the wireless signal quality is greater than or equal to the signal quality threshold, an impact of the wireless signal quality on the service delay is eliminated. The terminal device monitors a delay of an edge cloud closest to the terminal device (the phrase "closest to the terminal device" means the shortest geographical straight-line distance to the terminal device). If the delay of the edge cloud is less than a preset threshold, it is determined that the current service delay is caused by a carrier network delay, and in this case, calling the QoS acceleration capability is also ineffective. After one inhibition time, the terminal device performs again the step that the terminal device continuously monitors the service delay index. If the delay of the edge cloud is greater than or equal to the preset threshold, an impact of the carrier network delay on the service delay is eliminated, and in this case, the long service delay is most possibly caused by excessive load of the base station. After eliminating the possibility that the long service delay is caused by the wireless signal quality and the carrier network delay, the terminal device obtains a 4G communication system standard (or referred to as a duplex mode), and initiates sniffing on load of the base station based on the system standard, to obtain a delay measurement processing result (that is, a transmission delay). That the terminal device initiates sniffing on load of the base station based on the system standard, to obtain a delay measurement processing result includes: the terminal device measures, based on a duplex mode, a transmission delay on a target data link corresponding to the duplex mode; and if the transmission delay is less than a preset threshold (that is, the delay measurement processing result is less than the preset threshold), the terminal device determines that QoS acceleration calling can be initiated in this case, generates an acceleration request based on a parameter required for calling the QoS acceleration capability, and transmits the acceleration request to the service server, so that the service server completes QoS acceleration calling.

Figure 6:
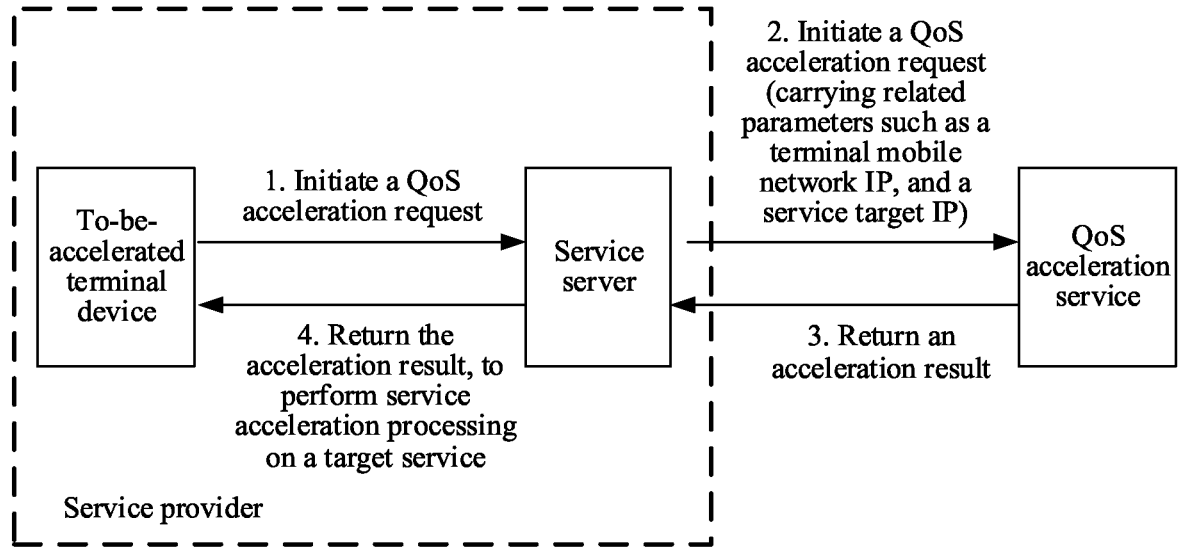
FIG. 6 is a schematic flowchart of calling a QoS acceleration capability according to an embodiment of this application.

In some embodiments, a specific procedure in which the service server calls the QoS acceleration capability after the terminal device generates the acceleration request is shown in FIG. 6, and includes the following steps: The terminal device generating the acceleration request is a "to-be-accelerated terminal device" in FIG. 6. The to-be-accelerated terminal device and a service server form a service provider, and the service provider initiates a QoS acceleration request to obtain a QoS acceleration service. A server providing the QoS acceleration service is a target server, and the target server is a network capability open platform of a telecommunications operator. Alternatively, the server providing the QoS acceleration service is a service server. As shown in FIG. 6, the to-be-accelerated terminal device first initiates a QoS acceleration request to the service server. Then, the service server initiates a QoS acceleration request carrying a related parameter to the target server. The target server calls the QoS acceleration capability and returns an acceleration result to the service server, and finally the service server feeds back the acceleration result to the to-be-accelerated terminal device, to perform acceleration processing on a target service run in the to-be-accelerated terminal device (that is, a user side).

In this embodiment of this application, when the delay is less than the standard index, estimation of a load situation of the base station is triggered. The terminal device first obtains a duplex mode used for data communication between the terminal device and the service server, and estimates a load situation on a particular data link (such as, an uplink or a downlink) of the base station based on the duplex mode. A plurality of factors may cause a target operation index to be less than the standard index, for example, poor signal quality and a long carrier network delay. Therefore, during estimation of load of the base station, the signal quality needs to be greater than a signal quality threshold, and the carrier network delay needs to be less than a delay threshold. In this way, the impact of the signal quality and the carrier network delay on the estimation of load of the base station can be eliminated, so that a load value obtained through estimation by the terminal device is more accurate. Based on the obtained load value, the terminal device (or the service server) can initiate a QoS service request when the base station is heavily loaded, thereby effectively avoiding ineffective calling of the QoS service, improving effectiveness of service calling, and further effectively implementing, on a service side, acceleration of the target service.

In some embodiments, the terminal device determines, based on transmission parameters corresponding to the base station when transmitting service data on the target data link, the load value of the base station. When determining whether the load value corresponding to the base station is greater than or equal to the load threshold, the terminal device can further transmit a test data packet to the base station through the target data link, and obtain a rate of a response to a service (namely, a service response rate) in the test data packet, and determine, based on the rate of the response of the base station to the service, whether the load value corresponding to the base station exceeds the load threshold. FIG. 7 is a schematic flowchart of determining a load situation of a base station according to an embodiment of this application. The method includes the following steps:

S401. Obtain a rate of a response to a service corresponding to a test data packet after the test data packet is sent to the base station.

The test data packet includes a data packet corresponding to service data. After receiving the test data packet, the base station can parse out the data packet corresponding to the service data from the test data packet, and respond to the data packet corresponding to the service data. If the test data packet is transmitted by the terminal device to the base station, the base station can transmit the data packet corresponding to the service data included in the test data packet to the service server after receiving the test data packet. The service server responds to a service requested by the terminal device. A rate of the response of the service server to the service is the rate of the response to the service corresponding to the test data packet. Alternatively, if the test data packet is transmitted by the service server to the base station, the base station can forward the data packet corresponding to the service data included in the test data packet to the terminal device after receiving the test data packet transmitted by the service server. The terminal device responds to a service requested by the service server. A rate of the response of the terminal device to the service is the rate of the response to the service corresponding to the test data packet.

In an embodiment, if the terminal device (or the service server) transmits only one test data packet, the service response rate is an actual rate of the response to the service of the test data packet; and if the terminal device (or the service server) transmits a plurality of test data packets, the service response rate is a sum, a mean value, or a weighted mean of actual service response rates corresponding to the plurality of test data packets. This is not limited in the embodiments of this application.

In an embodiment, when determining that a currently used duplex mode is a TDD mode, the terminal device can transmit a test data packet to the service server through the base station, or when determining that the currently used duplex mode is an FDD mode, the terminal device instructs the service server to transmit a test data packet to the base station, to determine a rate of a service response of the base station to the test data packet. In other words, if the target data link is an uplink, the terminal device obtains the service response rate; and if the target data link is a downlink, the terminal device transmits a notification message to the service server and the service server obtains the service response rate.

In some embodiments, when the target data link is an uplink, the terminal device transmits a plurality of first test data packets to the base station based on the uplink; determines an actual response rate of a response of the base station to a service corresponding to each of the first test data packets; and determines the actual response rate of each of the first test data packets as a transmission parameter of the uplink.

In some embodiments, when the target data link is a downlink, the terminal device transmits the notification message to the service server, where the notification message is used for instructing the service server to transmit a plurality of second test data packets to the base station based on the downlink, and the service server is configured to determine a transmission parameter corresponding to the downlink based on an actual response rate of each of second test data packets; and obtain the transmission parameters from the service server.

S402. The terminal device uses the service response rate as the load value of the base station.

In some embodiments, the terminal device determines a sum of the actual response rates of the first test data packets as the load value corresponding to the base station; or in some embodiments, the terminal device determines a mean value of the actual response rates of the first test data packets as the load value corresponding to the base station; or in some embodiments, the terminal device determines a weighted mean of the actual response rates of the first test data packets as the load value corresponding to the base station.

S403. The terminal device obtains a reference response rate of the base station, where the reference response rate is a rate obtained through statistics collection after the base station responds to test data packets.

The reference response rate refers to: in a case of a lightly-loaded base station, a reference rate of responses of the base station to the test data packets, that is, the reference response rate is a rate obtained through statistics collection after the base station responds to a large quantity of test data packets.

In some embodiments, after obtaining the reference response rate through statistics collection, the base station can generate a corresponding signal quality-response rate curve. The curve can be used for determining whether the base station is heavily loaded.

In some embodiments, the signal quality is represented by reference signal receiving power (RSRP) or a signal to interference plus noise ratio (SINR). After the signal quality-response rate curve is obtained, according to the signal quality-response rate curve diagram, the terminal device can find a reference response rate based on signal quality during a response to a service in a test data packet.

For example, it is assumed that when the signal quality is $RSRP_i$ during the $i^{th}$ response to the service of the test data packet, a corresponding response rate in a case of a lightly-loaded base station is $TR_i(RSRP_i)$, and an actual service response rate is $MR_i$. After the terminal device obtains I actual service response rates, a sum $$\left( \text{namely, } \sum\nolimits_{i=1}^{I} MR_i \right)$$

of I actual service response rates $MR_i$ is used as the service response rate. When the terminal device obtains the I actual service response rates, based on the signal quality corresponding to the terminal device each time the actual service response rate is obtained, if a sum of I response rates obtained in the signal quality-response rate curve is $$\sum\nolimits_{i=1}^{I} TR_i(RSRP_i),$$

the reference response rate is:

$$\sum\nolimits_{i=1}^{I} TR_i(RSRP_i),$$

where I is a positive integer.

The test data packet may be transmitted by the terminal device, or may be transmitted by the service server. If the test data packet is transmitted by the terminal device, the terminal device obtains the reference response rate; and if the test data packet is transmitted by the service server, the service server obtains the reference response rate.

S404. Determine that the load value of the base station is greater than or equal to the load threshold when the service response rate is less than a product of the reference response rate and a third threshold parameter.

The signal quality-response rate curve can be used for describing: rates of responses of a lightly-loaded base station to the test data packet when the terminal device is in different signal quality.

In some embodiments, the terminal device determines whether the load value corresponding to the base station exceeds the load threshold based on the service response rate and the reference response rate.

For example, the terminal device determines whether the load value corresponding to the base station exceeds the load threshold in the following manner: It is assumed that the service response rate is:

$$\sum\nolimits_{i=1}^{I} MR_i,$$

and the reference response rate is:

$$\sum\nolimits_{i=1}^{I} TR_i(RSRP_i).$$

When $\sum\nolimits_{i=1}^{I} MR_i < \rho \cdot \sum\nolimits_{i=1}^{I} TR_i(RSRP_i),$ it is determined that the load value corresponding to the base station is greater than or equal to the load threshold. $\rho$ is the preset third threshold parameter.

Whether the load value of the base station exceeds the load threshold may be determined by the terminal device or may be determined by the service server, which is not limited in the embodiments of this application.

In this embodiment of this application, before the acceleration request is generated, the service response rate is compared with the reference response rate to determine whether the load value of the base station is greater than the load threshold. Because the reference response rate is obtained based on a case that the load value of the base station is less than the load threshold, the load situation of the base station can be obtained directly and more quickly by comparing the service response rate and the reference response rate. For example, when the service response rate is less than the reference response rate, it may be determined that the base station is heavily loaded; and when the service response rate is greater than the reference response rate, it may be determined that the base station is lightly loaded.

In some embodiments, based on foregoing related descriptions of FIG. 4 and FIG. 7, an embodiment of this application further provides a data processing method. The data processing method is as follows: After the terminal device determines that the service response rate is less than the reference response rate, and that the ratio between the delay mean value and the delay standard deviation of the transmission delays is greater than a preset threshold, it is determined that the load value corresponding to the base station is greater than or equal to the load threshold, and an acceleration request is generated, to call the QoS acceleration capability more effectively.

In the data processing method provided in this embodiment of this application, the load situation of the base station is determined from two aspects: the service response rate and the transmission delay. In this way, accuracy of estimation of effectiveness of QoS capability calling can be further improved, thereby effectively reducing ineffective or inefficient calling of the QoS acceleration capability, and greatly reducing calling costs of a user.

Figure 8:
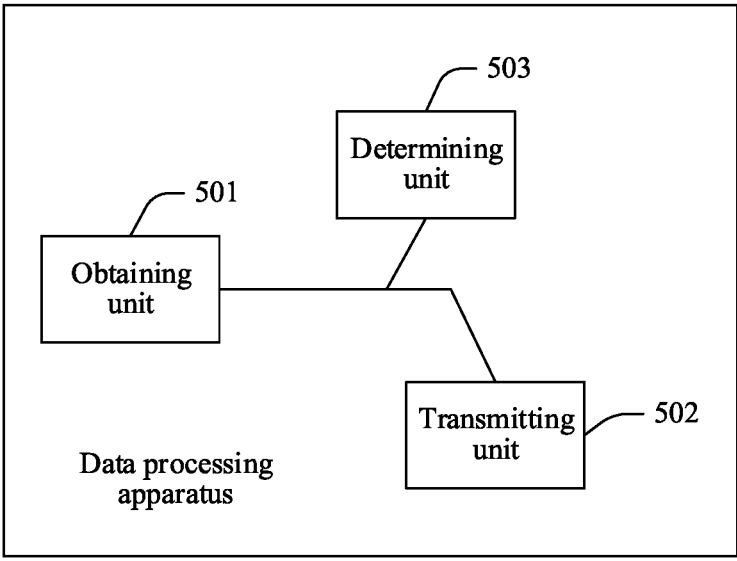
FIG. 8 is a schematic structural diagram of a data processing apparatus according to an embodiment of this application.

Based on the descriptions of the foregoing embodiments related to the data processing method, an embodiment of this application further provides a data processing apparatus. The data processing apparatus may be a computer program (including program code) run in the terminal device mentioned above. The data processing apparatus is configured to perform the method shown in FIG. 4 or FIG. 7. Referring to FIG. 8, the data processing apparatus (e.g., a terminal device) includes: an obtaining unit 501 and a transmitting unit 502.

The obtaining unit 501 is configured to determine a target data link between the terminal device and a base station when a delay in running a target service is less than a standard index, where the target data link is associated with a duplex mode currently used by the terminal device.

The obtaining unit 501 is further configured to determine a load value of a base station based on a transmission parameter of the target data link, where the transmission parameter is used for representing a transmission situation of transmitting a test data packet on the target data link.

The transmitting unit 502 is configured to transmit an acceleration request to a target server when the load value of the base station is greater than or equal to a load threshold, where the acceleration request is used for instructing the target server to perform service acceleration on the target service.

In some embodiments, when the target data link is an uplink, the obtaining unit 501 is further configured to transmit a plurality of first test data packets to the base station based on the uplink; determine a time difference between a transmitting time of each of the first test data packets and a receiving time corresponding to each of the first test data packets as the transmission delay of each of the first test data packets, where the transmitting time is a time when each of the first test data packets is transmitted to the base station, and the receiving time is a time when the feedback data packet corresponding to each of the first test data packets is received, and determine a transmission delay of each of the first test data packets as a transmission parameter of the uplink.

In some embodiments, the obtaining unit 501 is further configured to determine a delay mean value and a delay standard deviation of the transmission delays of the first test data packets; and determine a ratio between the delay mean value and the delay standard deviation as a load value of the base station.

In some embodiments, when the target data link is an uplink, the obtaining unit 501 is further configured to transmit a plurality of first test data packets to the base station based on the uplink; determine an actual response rate of a response of the base station to a service corresponding to each of the first test data packets; and determine the actual response rate of each of the first test data packets as a transmission parameter of the uplink.

In some embodiments, the obtaining unit 501 is further configured to implement any one of the following:

determining a sum of the actual response rates of the first test data packets as the load value of the base station;

determining a mean value of the actual response rates of the first test data packets as the load value of the base station; or determining a weighted mean value of the actual response rates of the first test data packets as the load value of the base station.

In some embodiments, the obtaining unit 501 is further configured to obtain a reference response rate of the base station, where the reference response rate is a rate obtained through statistics collection after the base station responds to test data packets; and determine that the load value of the base station is greater than or equal to the load threshold when the load value of the base station is less than a product of the reference response rate and a third threshold parameter.

In some embodiments, when the target data link is a downlink, the obtaining unit 501 is further configured to transmit a notification message to a service server, where the notification message is used for instructing the service server to transmit a plurality of second test data packets to the base station based on the downlink, and the service server is configured to determine a transmission parameter corresponding to the downlink based on a transmission delay or an actual response rate of each of the second test data packets; and obtain the transmission parameters from the service server.

In some embodiments, the delay of the target service includes a service processing delay. A determining unit 503 is configured to obtain a transient delay in executing the target service at a reference moment within a target period; determine a first average delay and a second average delay based on the transient delay, where the first average delay is an average delay in executing the target service at the reference moment, and the second average delay is an average delay in executing the target service within the target period; and determine the service processing delay of the target service based on the first average delay and the second average delay.

In some embodiments, the obtaining unit 501 is further configured to obtain a data transmission delay of the service server in response to signal quality of the terminal device being greater than a signal quality threshold; and determine that a target operation index is less than the standard index in response to the data transmission delay being greater than a delay threshold.

According to another embodiment of this application, steps in the methods shown in FIG. 4 and FIG. 7 may be performed by the units of the data processing apparatus shown in FIG. 8. For example: step S201 and step S202 shown in FIG. 4 may both be performed by the obtaining unit 501 in the data processing apparatus shown in FIG. 8, and step S203 may be performed by the transmitting unit 502 in the data processing apparatus shown in FIG. 8; and step S401 to step S403 shown in FIG. 7 may all be performed by the obtaining unit 501 in the data processing apparatus shown in FIG. 8, and step S404 may be performed by the determining unit 503 in the data processing apparatus shown in FIG. 8;

According to another embodiment of this application, the units in the data processing apparatus shown in FIG. 8 are divided based on logical functions, and may be separately or wholly combined into one or several other units, or one (or more) of the units may further be divided into a plurality of units of smaller functions. In this way, same operations can be implemented, and implementation of the technical effects of the embodiments of this application is not affected. In another embodiment of this application, the data processing apparatus may further include other units. In an actual application, the functions may also be cooperatively implemented by other units and may be cooperatively implemented by a plurality of units.

According to another embodiment of this application, a computer program (including program code) that can perform the steps in the corresponding methods shown in FIG. 4 or FIG. 7 may be run on a general computing device, such as a computer, which includes processing elements and storage elements such as a central processing unit (CPU), a random access memory (RAM), and a read-only memory (ROM), to construct the data processing apparatus shown in FIG. 8, and implement the data processing method in the embodiments of this application. The computer program may be recorded in, for example, a computer storage medium, and may be loaded into the foregoing computing device by using the computer storage medium, and run in the computing device.

In the embodiments of this application, by obtaining the duplex mode used in data communication between the terminal device and the service server, the data processing apparatus enables the terminal device to obtain the corresponding load value of the base station when data is transmitted on the target data link corresponding to the duplex mode, and generate the acceleration request when the load value is greater than or equal to the load threshold, so as to perform service acceleration on the target service and effectively avoid ineffective calling of an acceleration capability.

Figure 9:
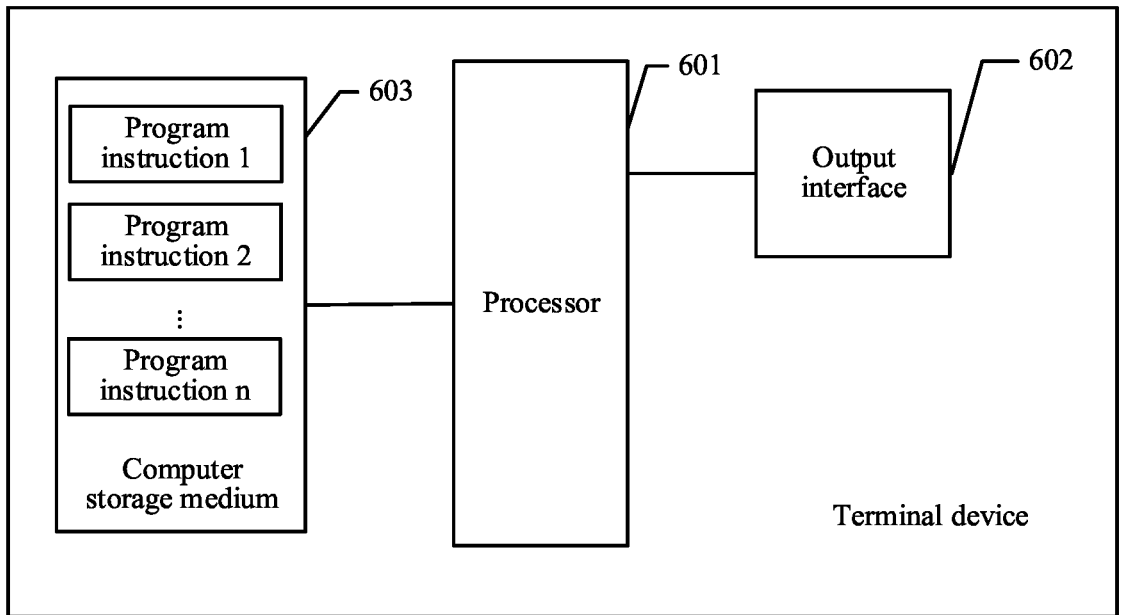
FIG. 9 is a schematic structural diagram of a terminal device according to an embodiment of this application.

Based on descriptions of the foregoing method embodiments and apparatus embodiment, an embodiment of this application further provides a terminal device. Referring to FIG. 9, the terminal device includes at least a processor 601, an output interface 602, and a computer storage medium 603, and the processor 601, the output interface 602, and the computer storage medium 603 in the terminal device may be connected by using a bus or in another manner.

The computer storage medium 603 is a memory device in the terminal device and is configured to store a program or data. It may be understood that the computer storage medium 603 herein may include an internal storage medium in the terminal device and certainly may also include an extended storage medium supported by the terminal device. The computer storage medium 603 provides storage space, and the storage space stores an operating system of the terminal device. In addition, the storage space further stores one or more instructions suitable for being loaded and executed by the processor 601. The instructions may be one or more computer programs (including program code). The computer storage medium herein may be a high-speed random access memory (RAM), or may be a non-volatile memory, such as at least one magnetic disk storage. Optionally, the computer storage medium may be at least one computer storage medium far away from the foregoing processor. The processor 601 (or referred to as a central processing unit (CPU)) is a computing core and a control core of the terminal device, is suitable for implementing one or more instructions, and is specifically suitable for loading and executing one or more instructions to implement a corresponding method procedure or a corresponding function.

In an embodiment, the processor 601 may load and execute the one or more instructions stored in the computer storage medium 603, to implement corresponding method steps in the embodiments of the data processing method shown in FIG. 4 and FIG. 7. During implementation, the one or more instructions in the computer storage medium 603 are loaded by the processor 601 to perform the following steps:

determining a target data link when a delay in running a target service is less than a standard index, the target data link being associated with a duplex mode currently used by a terminal device;

determining a load value of a base station based on a transmission parameter of the target data link, the transmission parameter being used for representing a transmission situation of transmitting a test data packet on the target data link; and transmitting an acceleration request to a target server when the load value of the base station is greater than or equal to a load threshold, the acceleration request being used for instructing the target server to perform service acceleration on the target service.

In some embodiments, the processor 601 is configured to perform the following operations:

transmitting, when the target data link is an uplink, a plurality of first test data packets to the base station based on the uplink;

determining a time difference between a transmitting time of each of the first test data packets and a receiving time corresponding to each of the first test data packets as a transmission delay of each of the first test data packets, wherein the transmitting time is a time when each of the first test data packets is transmitted to the base station, and the receiving time is a time when a feedback data packet corresponding to each of the first test data packets is received; and determining the transmission delay of each of the first test data packets as a transmission parameter of the uplink.

In some embodiments, the processor 601 is configured to perform the following operations:

determining a delay mean value and a delay standard deviation of the transmission delays of the first test data packets; and determining a ratio between the delay mean value and the delay standard deviation as the load value of the base station.

In another implementation, the processor 601 is configured to perform the following operations:

transmitting, when the target data link is an uplink, a plurality of first test data packets to the base station based on the uplink;

determining an actual response rate of a response of the base station to a service corresponding to each of the first test data packets; and determining the actual response rate of each of the first test data packets as a transmission parameter of the uplink.

In another implementation, the processor 601 is configured to perform any one of the following operations:

determining a sum of the actual response rates of the first test data packets as the load value of the base station;

determining a mean value of the actual response rates of the first test data packets as the load value of the base station; or determining a weighted mean value of the actual response rates of the first test data packets as the load value of the base station.

In another implementation, the processor 601 is further configured to perform the following operations:

obtaining a reference response rate of the base station, wherein the reference response rate is a rate obtained through statistics collection after the base station respond to test data packets; and determining that the load value of the base station is greater than or equal to the load threshold when the load value of the base station is less than a product of the reference response rate and a third threshold parameter.

In another implementation, the processor 601 is further configured to perform the following operations:

transmitting a notification message to a service server when the target data link is a downlink, wherein the notification message is used for instructing the service server to transmit a plurality of second test data packets to the base station based on the downlink, and the service server is configured to determine a transmission parameter corresponding to the downlink based on a transmission delay or an actual response rate of each of the second test data packets; and obtaining the transmission parameter from the service server.

In another implementation, the delay of the target service includes a service processing delay, and the processor 601 may further be configured to perform the following operations:

obtaining a transient delay in executing the target service at a reference moment within a target period;

determining a first average delay and a second average delay based on the transient delay, wherein the first average delay is an average delay in executing the target service at the reference moment, and the second average delay is an average delay in executing the target service within the target period; and determining the service processing delay of the target service based on the first average delay and the second average delay.

In another implementation, the delay of the target service includes a data transmission delay, and the processor 601 is further configured to perform the following operations:

obtaining the data transmission delay of the target service when signal quality of the terminal device is greater than a signal quality threshold, wherein the data transmission delay is a transmission delay in transmitting service data of the target service in a direction from the terminal device to an edge cloud, and the edge cloud is a small-scale cloud data center that is distributed on an edge of a network and that is used for providing real-time data processing, and analysis and decision.

In the embodiments of this application, by obtaining the duplex mode used in data communication between the terminal device and the service server, the terminal device is enabled to obtain the corresponding load value of the base station when data is transmitted on the target data link corresponding to the duplex mode, and transmit the acceleration request when the load value is greater than or equal to the load threshold, so as to perform service acceleration on the target service and effectively avoid ineffective calling of an acceleration capability.

An embodiment of this application further provides a computer storage medium, storing the computer program of the foregoing data processing method. The computer program includes a program instruction, and when one or more processors load and execute the program instruction, descriptions of the data processing method in the embodiments can be implemented, which are not described herein again. The description of beneficial effects of the same method is not described herein again. The program instruction can be deployed on and executed by one or more devices that can communicate with each other.

According to an aspect of the embodiments of this application, a computer program product is further provided, the computer program product includes a computer instruction, and the computer instruction is stored in a computer-readable storage medium. A processor of a terminal device reads the computer instruction from the computer-readable storage medium, and executes the computer instruction, to cause the terminal device to perform the methods provided in the optional implementations of the embodiments related to the data processing method shown in FIG. 4 and FIG. 7.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. In addition, it is to be understood that, what is disclosed above is merely exemplary embodiments of this application, and certainly is not intended to limit the protection scope of this application. Therefore, equivalent variations made in accordance with the claims of this application shall fall within the scope of this application.

What is claimed is:

1. A data processing method performed by a terminal device, the method comprising:

determining a target data link between the terminal device and a base station when a delay in running a target service is less than a standard index, the target data link being associated with a duplex mode currently used by the terminal device;

transmitting, when the target data link is an uplink between the terminal device and the base station, a plurality of first test data packets to the base station based on the uplink;

determining a load value of the base station based on a transmission parameter of the target data link, the transmission parameter representing a transmission situation of transmitting a test data packet on the target data link, further comprising:

determining an actual response rate of a response of the base station to a service corresponding to each of the first test data packets as the transmission parameter of the uplink; and determining one of (i) a sum of the actual response rates of the first test data packets, (ii) a mean value of the actual response rates of the first test data packets, and (iii) a weighted mean value of the actual response rates of the first test data packets as the load value of the base station; and transmitting an acceleration request to a target server when the load value of the base station is greater than or equal to a load threshold, the acceleration request instructing the target server to perform service acceleration on the target service.

2. The method according to claim 1, further comprising:

determining a time difference between a transmitting time of each of the first test data packets and a receiving time corresponding to the each of the first test data packets as a transmission delay of the each of the first test data packets, wherein the transmitting time is a time when the each of the first test data packets is transmitted to the base station, and the receiving time is a time when a feedback data packet corresponding to the each of the first test data packets is received by the terminal device; and determining the transmission delay of each of the first test data packets as a transmission parameter of the uplink.

3. The method according to claim 2, wherein the determining a load value of the base station based on a transmission parameter of the target data link comprises:

determining a delay mean value and a delay standard deviation of the transmission delays of the first test data packets; and determining a ratio between the delay mean value and the delay standard deviation as the load value of the base station.

4. The method according to claim 1, further comprising:

obtaining a reference response rate of the base station, wherein the reference response rate is a rate obtained through statistics collection after the base station responds to test data packets; and determining that the load value of the base station is greater than or equal to the load threshold when the load value of the base station is less than a product of the reference response rate and a third threshold parameter.

5. The method according to claim 1, further comprising:

transmitting a notification message to a service server when the target data link is a downlink between the terminal device and the base station, the notification message instructing the service server to transmit a plurality of second test data packets to the base station based on the downlink, and the service server is configured to determine a transmission parameter corresponding to the downlink based on a transmission delay or an actual response rate of each of the second test data packets; and obtaining the transmission parameter from the service server.

6. The method according to claim 1, wherein the delay of the target service comprises a service processing delay, and the method further comprises:

obtaining a transient delay in executing the target service at a reference moment within a target period;

determining a first average delay and a second average delay based on the transient delay, wherein the first average delay is an average delay in executing the target service at the reference moment, and the second average delay is an average delay in executing the target service within the target period; and determining the service processing delay of the target service based on the first average delay and the second average delay.

7. The method according to claim 1, wherein the delay of the target service comprises a data transmission delay, and the method further comprises:

obtaining the data transmission delay of the target service when signal quality of the terminal device is greater than a signal quality threshold, wherein the data transmission delay is a transmission delay in transmitting service data of the target service in a direction from the terminal device to an edge cloud, and the edge cloud is a small-scale cloud data center that is distributed on an edge of a network and that is used for providing real-time data processing, and analysis and decision.

8. A terminal device, comprising an output interface, and further comprising:

a processor, suitable to implement one or more instructions; and a computer storage medium, storing one or more instructions, the one or more instructions being suitable to be loaded by the processor to perform a data processing method including:

determining a target data link between the terminal device and a base station when a delay in running a target service is less than a standard index, the target data link being associated with a duplex mode currently used by the terminal device;

transmitting, when the target data link is an uplink between the terminal device and the base station, a plurality of first test data packets to the base station based on the uplink;

determining a load value of the base station based on a transmission parameter of the target data link, the transmission parameter representing a transmission situation of transmitting a test data packet on the target data link, further comprising:

determining an actual response rate of a response of the base station to a service corresponding to each of the first test data packets as the transmission parameter of the uplink; and determining one of (i) a sum of the actual response rates of the first test data packets, (ii) a mean value of the actual response rates of the first test data packets, and (iii) a weighted mean value of the actual response rates of the first test data packets as the load value of the base station; and transmitting an acceleration request to a target server when the load value of the base station is greater than or equal to a load threshold, the acceleration request instructing the target server to perform service acceleration on the target service.

9. The terminal device according to claim 8, wherein the method further comprises:

determining a time difference between a transmitting time of each of the first test data packets and a receiving time corresponding to the each of the first test data packets as a transmission delay of the each of the first test data packets, wherein the transmitting time is a time when the each of the first test data packets is transmitted to the base station, and the receiving time is a time when a feedback data packet corresponding to the each of the first test data packets is received by the terminal device; and determining the transmission delay of each of the first test data packets as a transmission parameter of the uplink.

10. The terminal device according to claim 9, wherein the determining a load value of the base station based on a transmission parameter of the target data link comprises:

determining a delay mean value and a delay standard deviation of the transmission delays of the first test data packets; and determining a ratio between the delay mean value and the delay standard deviation as the load value of the base station.

11. The terminal device according to claim 8, wherein the method further comprises:

transmitting a notification message to a service server when the target data link is a downlink between the terminal device and the base station, the notification message instructing the service server to transmit a plurality of second test data packets to the base station based on the downlink, and the service server is configured to determine a transmission parameter corresponding to the downlink based on a transmission delay or an actual response rate of each of the second test data packets; and obtaining the transmission parameter from the service server.

12. The terminal device according to claim 8, wherein the delay of the target service comprises a service processing delay, and the method further comprises:

obtaining a transient delay in executing the target service at a reference moment within a target period;

determining a first average delay and a second average delay based on the transient delay, wherein the first average delay is an average delay in executing the target service at the reference moment, and the second average delay is an average delay in executing the target service within the target period; and determining the service processing delay of the target service based on the first average delay and the second average delay.

13. The terminal device according to claim 8, wherein the delay of the target service comprises a data transmission delay, and the method further comprises:

obtaining the data transmission delay of the target service when signal quality of the terminal device is greater than a signal quality threshold, wherein the data transmission delay is a transmission delay in transmitting service data of the target service in a direction from the terminal device to an edge cloud, and the edge cloud is a small-scale cloud data center that is distributed on an edge of a network and that is used for providing real-time data processing, and analysis and decision.

14. The method according to claim 8, wherein the method further comprises:

obtaining a reference response rate of the base station, wherein the reference response rate is a rate obtained through statistics collection after the base station responds to test data packets; and determining that the load value of the base station is greater than or equal to the load threshold when the load value of the base station is less than a product of the reference response rate and a third threshold parameter.

15. A non-transitory computer-readable storage medium, storing one or more instructions, the one or more instructions being suitable to be loaded by a processor of a terminal device to perform a data processing method including:

determining a target data link between the terminal device and a base station when a delay in running a target service is less than a standard index, the target data link being associated with a duplex mode currently used by the terminal device;

transmitting, when the target data link is an uplink between the terminal device and the base station, a plurality of first test data packets to the base station based on the uplink;

determining a load value of the base station based on a transmission parameter of the target data link, the transmission parameter representing a transmission situation of transmitting a test data packet on the target data link, further comprising:

determining an actual response rate of a response of the base station to a service corresponding to each of the first test data packets as the transmission parameter of the uplink; and determining one of (i) a sum of the actual response rates of the first test data packets, (ii) a mean value of the actual response rates of the first test data packets, and (iii) a weighted mean value of the actual response rates of the first test data packets as the load value of the base station; and transmitting an acceleration request to a target server when the load value of the base station is greater than or equal to a load threshold, the acceleration request instructing the target server to perform service acceleration on the target service.

16. The non-transitory computer-readable storage medium according to claim 15, wherein the method further comprises:

determining a time difference between a transmitting time of each of the first test data packets and a receiving time corresponding to the each of the first test data packets as a transmission delay of the each of the first test data packets, wherein the transmitting time is a time when the each of the first test data packets is transmitted to the base station, and the receiving time is a time when a feedback data packet corresponding to the each of the first test data packets is received by the terminal device; and determining the transmission delay of each of the first test data packets as a transmission parameter of the uplink.

17. The non-transitory computer-readable storage medium according to claim 15, wherein the method further comprises:

transmitting a notification message to a service server when the target data link is a downlink between the terminal device and the base station, the notification message instructing the service server to transmit a plurality of second test data packets to the base station based on the downlink, and the service server is configured to determine a transmission parameter corresponding to the downlink based on a transmission delay or an actual response rate of each of the second test data packets; and obtaining the transmission parameter from the service server.

18. The non-transitory computer-readable storage medium according to claim 15, wherein the delay of the target service comprises a service processing delay, and the method further comprises:

obtaining a transient delay in executing the target service at a reference moment within a target period;

determining a first average delay and a second average delay based on the transient delay, wherein the first average delay is an average delay in executing the target service at the reference moment, and the second average delay is an average delay in executing the target service within the target period; and determining the service processing delay of the target service based on the first average delay and the second average delay.

19. The non-transitory computer-readable storage medium according to claim 15, wherein the method further comprises:

obtaining a reference response rate of the base station, wherein the reference response rate is a rate obtained through statistics collection after the base station responds to test data packets; and determining that the load value of the base station is greater than or equal to the load threshold when the load value of the base station is less than a product of the reference response rate and a third threshold parameter.

* * * * *